Nov. 11, 1969 K. B. ADAMS 3,477,585
RACK FOR ELECTRICAL CORDS
Filed Sept. 5, 1967

INVENTOR.
KATHAREN B. ADAMS
BY
ATTORNEYS

United States Patent Office 3,477,585
Patented Nov. 11, 1969

3,477,585
RACK FOR ELECTRICAL CORDS
Katharen B. Adams, 2922 S. Garfield St.,
Denver, Colo. 80210
Filed Sept. 5, 1967, Ser. No. 665,621
Int. Cl. A47f 7/00, 5/08; F16g 11/00
U.S. Cl. 211—60                          8 Claims

ABSTRACT OF THE DISCLOSURE

Rack for flexible cords comprising one or plurality of spaced support members carried by backing member arranged mounting on wall surface. Each support member including staitonary offset portion and elongated intermediate portion having two continuous stretches and movable offset portion mounted adjacent intermediate portion oppositely of stationary offset portion for winding cord in coiled form thereon. Movable offset portion mounted to rotatably move from supporting position to position shortening distance between offset portions for quick detachment of coiled cord. Stationary and movable holding members on rack having portions for securing attachment device on end of cord. Movable holding member having gripping surfaces for slidable movement along intermediate portion.

---

This invention relates to racks for holding flexible cords and particularly quick-disconnect cords used with electric appliances, tools and the like. Many electrical appliances and tools presently in use are equipped with electric cords having conectors at each end which connect and disconnect between the appliances and the power outlet. Some cords for appliances such as electric skillets are equipped with controllers to regulate the amount of electric power to the skillet. When not in use, such cords are frequently placed in receptacles or drawers causing them to tangle and they frequently become misplaced. Accordingly, it is an object of this invention to provide a simple, durable and convenient rack for the storage and support of elecrtic cords and the like.

Another object of this invention is to provide a rack suitable for holding electric cords of various lengths and cords having various electrical attachment devices adjoining the ends.

It is a further object of this invention to provide a rack which may be quickly and easily installed on planar surfaces at convenient locations such as on closet or cabinet doors and on walls.

Still a further object of this invention is to provide a novel rack for electrical cords and the like in which the cord while in coiled form may be quickly demounted.

Other objects, advantages and capabilities of the present invention will become apparent in considering the following description taken in conjunction with the accompanying drawings in which.

Figure 1:
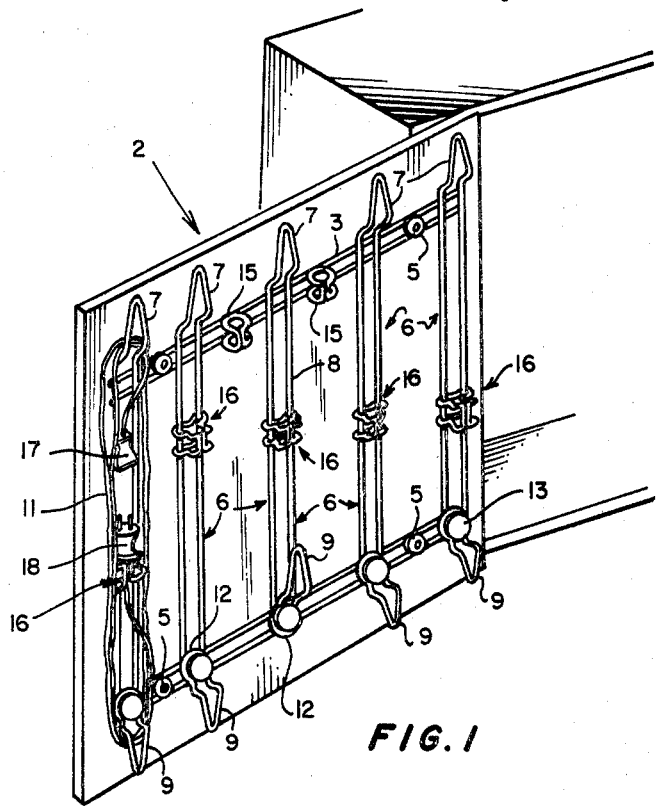
FIG. 1 is a perspective view of a cord rack embodying features of the present invention illustrated as mounted on the inside of a cabinet door with a cord positioned in place on one of a plurality of support members with another support member shown in an inturned position.

Referring now to the drawings in FIG. 1 there is shown a rack detachably fastened to the inside of a cabinet door 2 and disposed in an upright position so as to swing with the door during its opening and closing and not interfere with its usual swinging movements. While a cabinet door has been used for purposes of illustration, it is understood that this rack may be mounted on various types of planar surfaces such as room walls, doors, cabinet walls and the like at desired locations.

As shown the rack comprises a frame or backing member in the form of spaced upper and lower cross members 3 and 4 arranged for receiving fasteners 5 such as screws for securing the assembly in an upright position on the door 2. One or a plurality of similar cord support members 6 are arranged in substantially perpendicular relation to the cross members and are secured thereon at adjoining points of contact.

Each support member 6 comprises a stationary offset portion 7 and on elongated intermediate portion 8 having parallel stretches which forms an extension of the offset portion 7 and an elongated intermediate portion 8 having parallel stretches which form an extension of the offset portion. In a preferred construction these portions will be formed of a continuous piece of resilient material such as rod-like metal or wire. This continuous piece of material is shaped or bent so as to form the offset portion intermediate its ends with the elongated stretches being secured to the upper and lower cross members 3 and 4.

Figure 2:
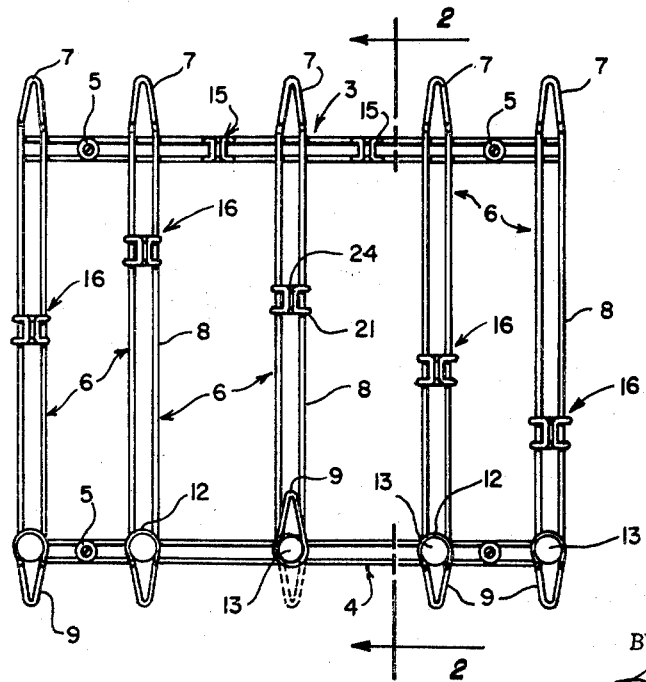
FIG. 2 is a front elevation view of the rack shown in FIG. 1 with the cord removed.

A second movable offset portion 9 of the support member similar in shaping to the stationary offset portion is rotatably mounted adjacent the lower end of the intermediate portion oppositely of the stationary offset portion to form therewith opposing surfaces on which an electric cord 11 is placed as by winding the cord thereon. This offset portion is secured so as to move to a position in overlying relation with the stretches of the intermediate portion as shown by the center support member in FIGS. 1–3 to shorten the distance between these offset portions to permit removal of the coiled cord.

Figure 3:
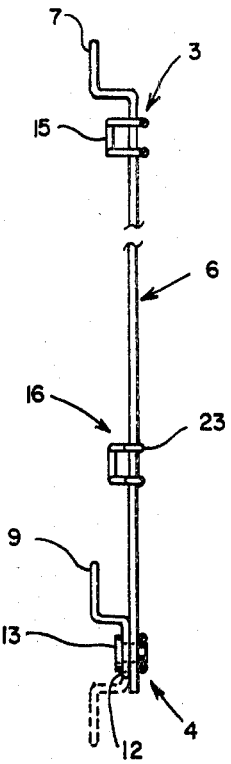
FIG. 3 is a sectional view taken along lines 3—3 of FIG. 2 showing essentially a side elevation view of the rack.

While it is understood that various arrangements are suitable to facilitate the movement of offset portion 9 to the cord release position a preferred manner is illustrated wherein the offset portion 9 is formed of a continuous piece of material similar to portions 7 and 8 having the cord engaging portion of similar shape to offset portion 7 and shaped with a looped portion 12 at one end. A pivot pin 13 having a flat head extends through the looped portion and the lower cross member so as to secure the offset portion for rotational movement to cord release position wherein the offset portion 9 is disposed in overlying relation to one end of the intermediate portion (FIG. 3).

Similar stationary and movable holding members 15 and 16 are disposed at various positions on the backing and support assembly for holding the free end portions of the cords. Electric cords are equipped with various types of connectors and controllers and the term attachment device as used herein is intended to cover all forms of connectors and controllers for regulating the electric power delivered to an appliance or tool. As shown in FIG. 1 the cord 11 includes attachment devices 17 and 18 at each end with the latter being supported on the movable holding member which draws the associated free end of the cord to a substantially taut position.

These holding members 15 and 16 comprise spaced arm portions 21 and 22 joined by an arcuate bight portion 23 to form upper seating surfaces on which the attachment device is disposed. The arm portions turn inwardly and form a slotted portion 24 through which the cord adjoining the attachment device slides. Once the cord is slipped through the slotted portion, it is retained between the arms by the inturned portions.

The bight portion and arms of movable holding members are shaped along inner surfaces so as to provide a gripping relationship with the exterior surfaces or stretch portions of the intermediate portion 8 so the intermediate portion provides guide surfaces for slidable movement throughout its lengthwise extent so as to accommodate cords of various lengths while at the same time clamping the holding member at selected positions therealong.

Engaging surfaces of the movable holding member and/or the intermediate portions will preferably be formed of a resilient material suitably dimensioned to provide a friction fitting relationship therebetween. A preferred construction for the holding members which is particularly suitable for use in combination with the spaced rod-like construction of the intermediate portion shown is to form the holding member of a single rod-like piece as shown with the inner support engaging surfaces being generally arcuate so as to conform with the external surfaces of the intermediate stretch and constructed of a similar resilient metal or wire which results in a good friction engagement therebetween.

In a preferred construction the rod-shaped resilient material for the various component parts will be a metal such as aluminum and may be of various metals coated with rubber or plastic to make sure that no sharp area exists to damage or cut the electrical cords. The component may also be formed entirely of molded plastics. The backing member may be of single piece construction such as a single plate arranged to be mounted on the supporting surface. The component parts of the rack may be made of solid pieces of metal or molded plastic with rounded edge surfaces so that no sharp edges will sever the insulation on the electric cord.

While the present invention has been described with reference to particular structural details, there is no intent to limit the spirit and scope of the present invention to the precise details.

I claim:

1. A rack for electric cords and the like comprising a backing member inclusive of spaced upper and lower cross members having means for attachment to a planar surface, a plurality of support members disposed on and in substantially perpendicular relation to the cross members and disposed in spaced side by side relationship, each said support member including a first offset portion and an elongated intermediate portion having two cooperative stretches forming an extension of the offset portion, said portions being formed as a continuous piece of material and a second similar offset portion rotatably mounted adjacent an end of the intermediate portion oppositely of said first offset portion to form therewith opposing surfaces for the winding of a cord in coiled form thereon and rotatable to a position to shorten the distance between said offset portions and thereby facilitate removal of a coiled cord, and at least one holding member having gripping surfaces disposed in frictional engagement with said intermediate portion and movable along its lengthwise extent, said holding member having means for the supporting of an attachment device on an end of the cord.

2. A rack as set forth in claim 1 wherein said plurality of support members are disposed in spaced parallel relationship on said cross members.

3. A rack as set forth in claim 1 including at least one stationary holding member similar to said movable holding member disposed on one of said cross members for the supporting of an attachment device on an end of the cord.

4. A rack for electric cords and the like comprising a backing member inclusive of spaced upper and lower cross members having means for attachment to a planar surface and at least one support member disposed transversely on the backing member and including a first offset portion and an elongated intermediate portion having two cooperative stretches forming an extension of the offset portion, said portions being formed as a continuous piece of material and a second similar offset portion rotatably mounted adjacent an end of the intermediate portion oppositely of said first offset portion to form therewith opposing surfaces for the winding of a cord in coiled form thereon and rotatable to a position to shorten the distance between said offset portions and thereby facilitate removal of a coiled cord, and a holding member having gripping surfaces disposed in frictional engagement with said intermediate portion and movable along its lengthwise extent, said holding member having means for the supporting of an attachment device on an end of the cord.

5. A rack as set forth in claim 4, wherein said second offset portion rotates to an overlying position with respect to an end of the intermediate portion for removal of the cord.

6. A rack as set forth in claim 4, wherein said support member is formed of rod-like material.

7. A rack as set forth in claim 4, wherein the gripping surfaces of said holding member are formed of a resilient material.

8. A rack as set forth in claim 4, wherein said holding member is formed as a continuous piece of material.

References Cited

UNITED STATES PATENTS

| | | | |
|---|---|---|---|
| 337,637 | 3/1886 | Thies | 242—96 |
| 1,365,762 | 1/1921 | Zinow | 24—132 X |
| 2,025,437 | 12/1935 | Brown | 211—106 X |
| 2,510,711 | 6/1950 | Morsch | 248—117.1 |
| 3,198,343 | 8/1965 | Pollock | 211—87 |
| 366,812 | 7/1887 | Brinkerhoff | 248—493 |

CHANCELLOR E. HARRIS, Primary Examiner

U.S. Cl. X.R.

24—123, 132; 211—106, 108